United States Patent [19]

Salomon

[11] Patent Number: 5,102,546
[45] Date of Patent: Apr. 7, 1992

[54] FILTER VESSEL HAVING A DRIP LOCK FOR A COFFEE OR TEA MAKER

[75] Inventor: Thomas Salomon, Schloss Holte, Fed. Rep. of Germany

[73] Assignee: Melitta Haushaltsprodukte GmbH & Co. KG, Minden, Fed. Rep. of Germany

[21] Appl. No.: 655,855

[22] Filed: Feb. 15, 1991

[30] Foreign Application Priority Data

Feb. 15, 1990 [DE] Fed. Rep. of Germany ....... 4004656

[51] Int. Cl.$^5$ .......................................... B01D 29/085
[52] U.S. Cl. .................................. 210/469; 210/470; 210/474; 210/482; 210/497.3; 99/289 D
[58] Field of Search ............... 210/464, 469, 470, 474, 210/482, 497.3, 499; 99/289 D, 289 P

[56] References Cited

U.S. PATENT DOCUMENTS

| 892,000 | 6/1908 | MacKaskie | 210/497.3 |
|---|---|---|---|
| 1,066,788 | 7/1913 | Bowen | 210/470 |
| 1,073,081 | 9/1913 | Jacobson | 210/470 |
| 4,895,656 | 1/1990 | Smit | 210/497.3 |
| 4,957,632 | 9/1990 | Backstiegel et al. | 210/497.3 |

FOREIGN PATENT DOCUMENTS 7436286 7/1975 Fed. Rep. of Germany .
8702615 5/1987 Fed. Rep. of Germany .

Primary Examiner—Robert A. Dawson
Assistant Examiner—Wanda L. Millard
Attorney, Agent, or Firm—Spencer & Frank

[57] ABSTRACT

A filter vessel has a beverage outlet and a closing device movable between closed and open positions in which a plug blocks and, respectivley, frees the outlet. The closing device has an operating member pivotally secured to the filter holder for movement toward and away from the outlet; and a leg disposed below the outlet and carrying the plug. The leg has a resilient end portion supported on the operating member, while an opposite end of the leg is pivotally secured to the operating member so that the leg may move relative to the operating member towards and away from the outlet. There is further provided an abutment member disposed on the filter holder and being in engagement with the leg at a location between the plug and the pivotal end of the leg. Thus, an external pressing force exerted on the actuating component and directed toward the abutment member causes a pivotal motion of the operating member and a pivotal motion of the leg away from the outlet and relative to the operating member against the closing force of the resilient portion to move the plug into the open position.

9 Claims, 6 Drawing Sheets

Fig. 4
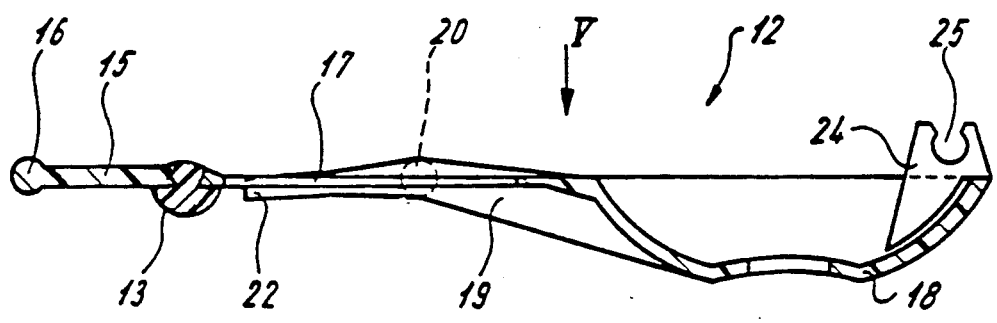
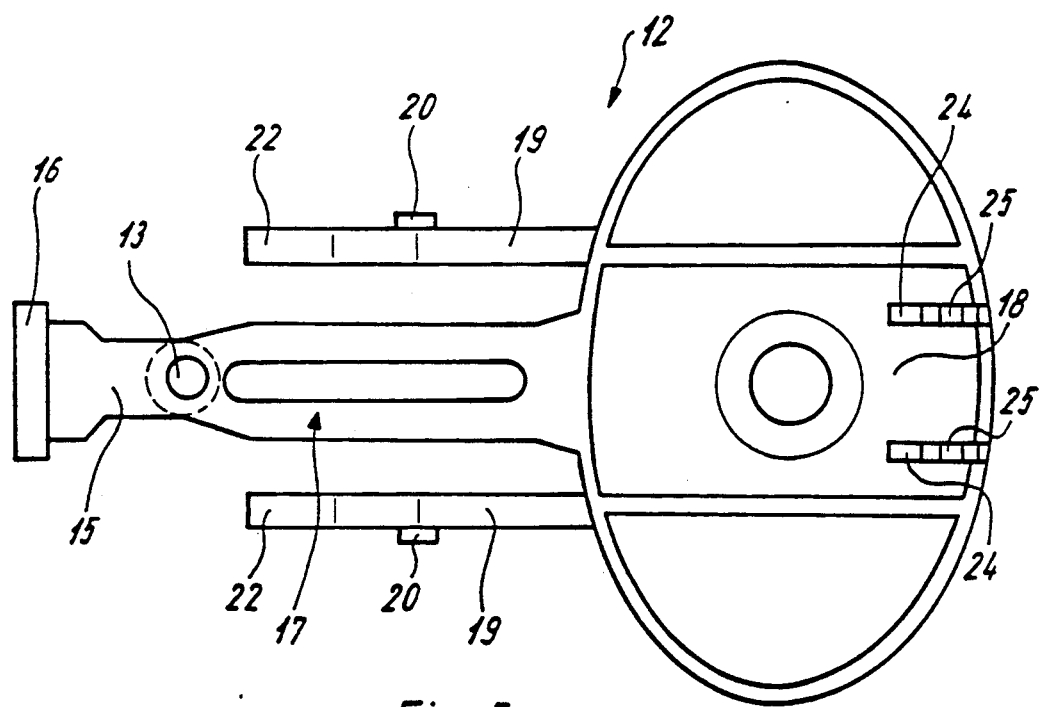
Fig. 5

FILTER VESSEL HAVING A DRIP LOCK FOR A COFFEE OR TEA MAKER

CROSS REFERENCE TO RELATED APPLICATION

This application claims the priority of German Application No. P 40 04 656.7 filed Feb. 15th, 1990, which is incorporated herein by reference.

BACKGROUND OF THE INVENTION

This invention relates to a filter vessel for a coffee or tea maker having a brewed beverage outlet closing device. The closing device or drip lock includes a closing plug which allows the brewed beverage to flow into a pitcher when the plug is held away from the outlet in an open position by the lid of a pitcher placed underneath the filter vessel. When there is no pitcher present, the drip lock automatically holds the plug in a closed position blocking the outlet.

Filter vessels of the above-described type are known.

The known closing devices have relatively complicated structures and since deposits and soiling from the outflowing coffee or tea cannot be prevented, they tend to malfunction.

SUMMARY OF THE INVENTION

It is an object of the invention to provide an improved filter vessel of the above-outlined type which has a simplified closing device that is both malfunction-proof and easy to install.

This object and others to become apparent as the specification progresses, are accomplished by the invention according to which, briefly stated, the filter vessel has a beverage outlet and a closing device movable between closed and open positions in which a plug blocks and, respectively, frees the outlet. The closing device has an operating member pivotally secured to the filter holder for movement toward and away from the outlet; and a leg disposed below the outlet and carrying the plug. The leg has a resilient end portion supported on the operating member, while an opposite end of the leg is pivotally secured to the operating member so that the leg may move relative to the operating member towards and away from the outlet. There is further provided an abutment member disposed on the filter holder and being in engagement with the leg at a location between the plug and the pivotal end of the leg. Thus, an external pressing force exerted on the actuating component and directed toward the abutment member causes a pivotal motion of the operating member and a pivotal motion of the leg away from the outlet and relative to the operating member against the closing force of the resilient portion to move the plug into the open position.

A closing device of such design can be manufactured practically in one piece as the closing plug can be formed, for example, directly on the leg in a multi-component injection molding process. The working of the closing device according to the invention is ultimately based on the utilization of the spring force of the resilient section between the leg and the operating member thus making the closing device essentially resistant to malfunction, and also particularly resistant to soiling.

The entire closing device need be pivotally mounted only in the base region of the filter vessel, which can be accomplished in a simple manner by the pins on the extension arms.

DESCRIPTION OF THE DRAWINGS

FIG. 4 is a longitudinal sectional view of the closing device of the filter vessel of FIG. 1, before it is installed in the filter vessel.

FIG. 5 is a plan view of the closing device taken in the direction of arrow V in FIG. 4.

DESCRIPTION OF THE PREFERRED EMBODIMENTS

Turning to FIGS. 1 to 5, a filter vessel 10 of a first preferred embodiment of the invention shown therein has an outlet 11 which opens into the interior of the filter vessel 10, the interior being configured as a filter holder for receiving a typical coffee or tea filter. The outlet 11 can be closed by a closing device 12 having a plug 13.

Figure 1:
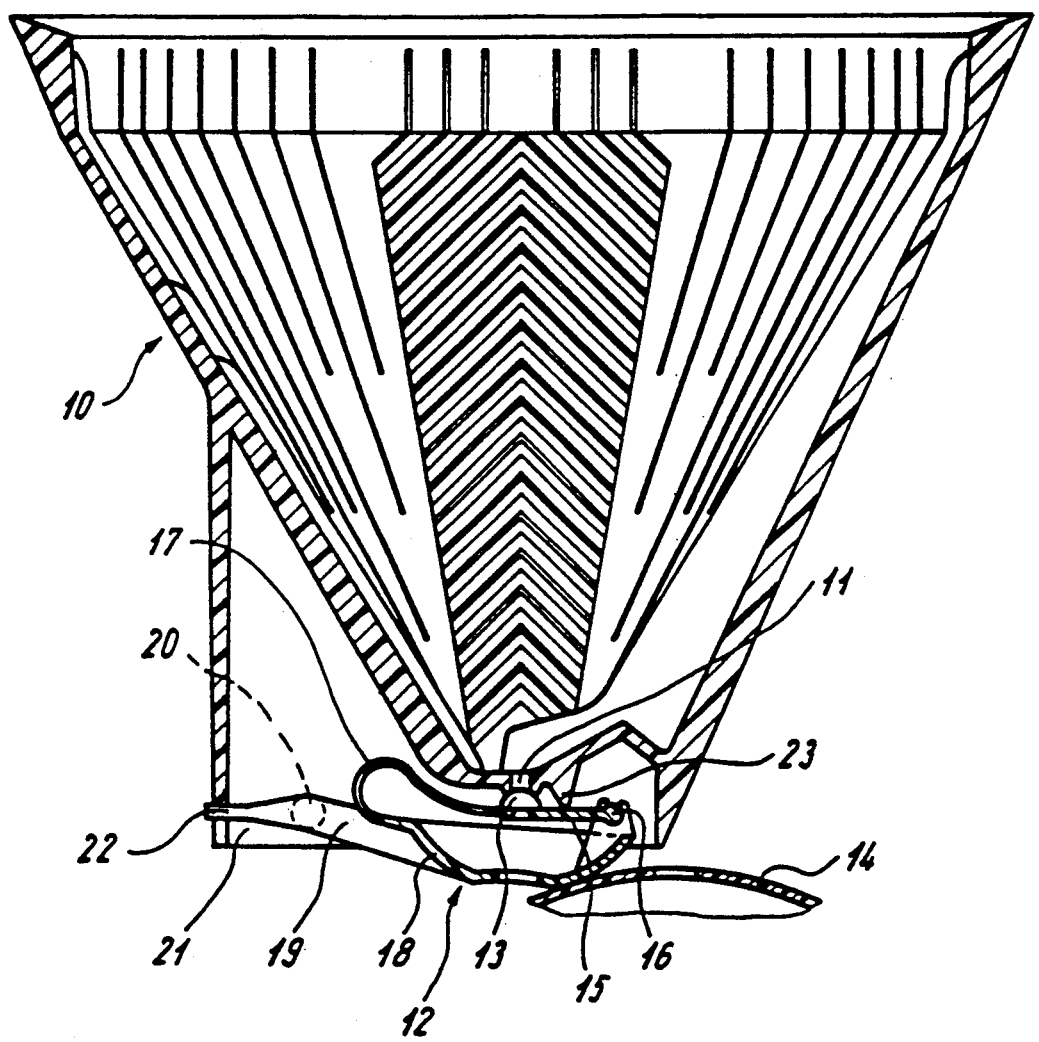
FIG. 1 is a sectional elevational view of a filter vessel according to the invention, with the outlet closed.

The closing device 12 can be actuated by a lid 14 of a pitcher (not shown). When the pitcher is placed underneath the filter vessel, the plug 13 is held in its open position spaced from the outlet 11. When the pitcher, and thus the lid 14, is moved away from the filter vessel 10, the plug 13 is automatically held in the closed position. FIG. 1 shows the closed position of the closing device 12.

Figure 2:
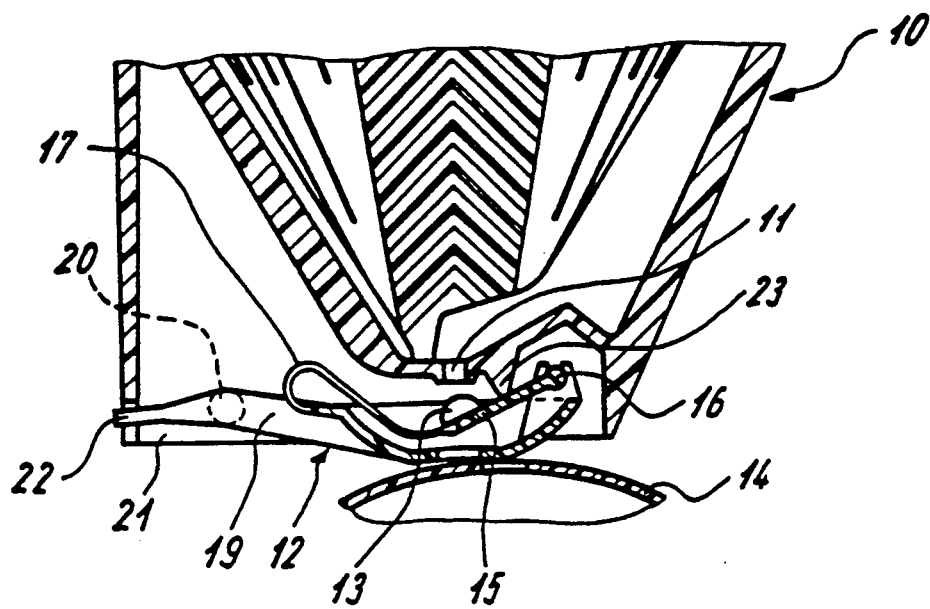
FIG. 2 is a partial view of the filter vessel of FIG. 1, with the closing device partially opened.

FIG. 2 shows an intermediate position of the closing device 12 when the pitcher is being moved relative to the filter vessel 10.

Figure 3:
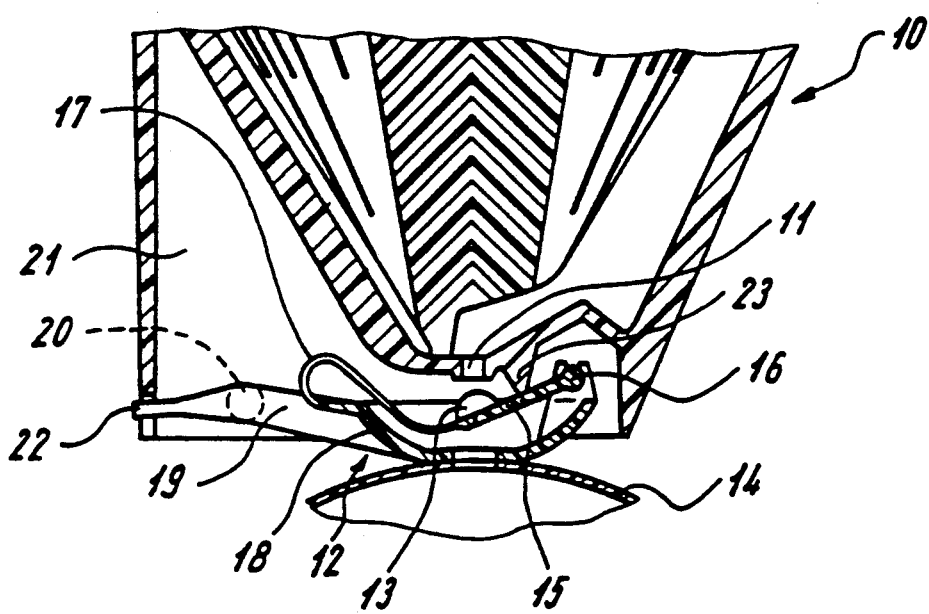
FIG. 3 is a view similar to FIG. 2, with the closing device completely opened.
Figure 6:
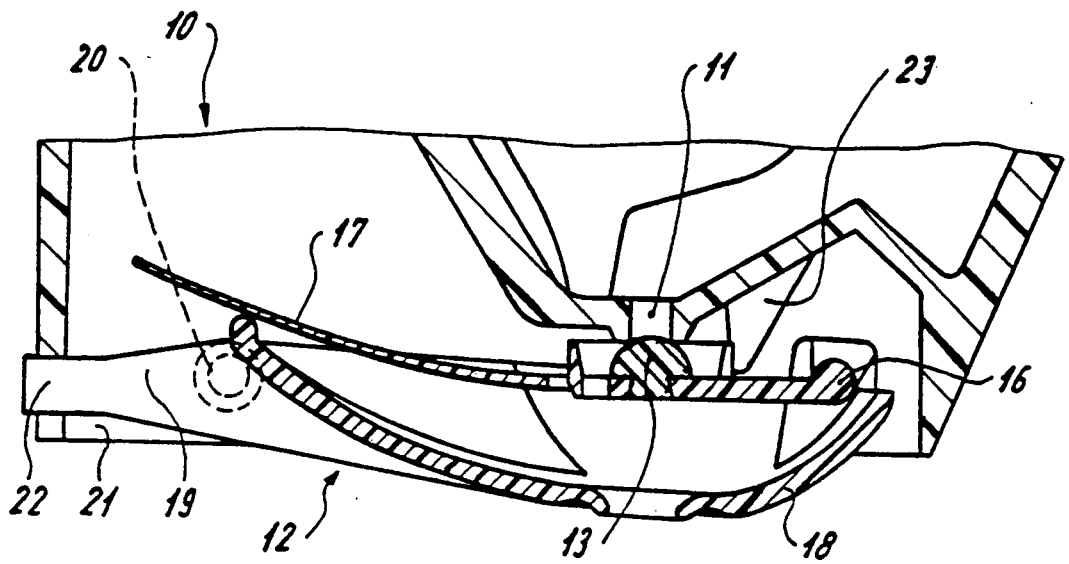
FIG. 6 is a sectional elevational view of a filter vessel according to a further embodiment of the invention, with the outlet closed.

FIG. 3 shows the completely open position of the closing device 12 when the pitcher is in place under the filter vessel 10 for collecting a brewed beverage such as coffee or tea.

The closing device 12 is configured in such a manner that the closing plug 13 is connected to a leg 15 which is pivotal about a horizontal shaft 16 laterally offset relative to the outlet 11 of the filter vessel 10. On its side facing away from the shaft 16, the leg 15 changes into a vertically resilient, arcuate section 17 which, in turn, is connected to an operating member 18 actuated by the lid 14 of the pitcher. The operating member 18 which also serves to support the shaft 16 about which the leg 15 pivots, has two arms 19 which extend beyond the side of the outlet 11 opposite the shaft 16. Each arm has a pin 20 which pivotally supports the respective arm 19 in a lower part or base 21 of the filter vessel 10. When the closing device 12 is installed in the filter vessel 10, free ends 22 of the arms 19 project beyond the pins 20 and are abutted at the base 21 of the filter vessel 10 to limit an upward motion of the arms 19. An abutment member 23, with which an upper face of the leg 15 is always in contact, is formed on the filter vessel 10 between the outlet 11 and the shaft 16.

FIGS. 4 and 5 show the closing device 12 prior to installation in the filter vessel 10, on an enlarged scale. The operating member 18 includes two ribs 24 with shaped-on bearing shells 25. The shaft 16, which is preferably shaped in one piece with the leg 15, is snapped into the bearing shells 25.

The operation of the first preferred embodiment of the invention will be described with reference to FIGS. 1 to 3.

If no pitcher and thus also no lid 14 is disposed underneath the filter vessel 10, or if the lid 14 contacts the operating member 18 only slightly, the spring force of the arcuate section 17 urges the leg 15 and the closing plug 13 upwardly, thus causing the plug 13 to contact and seal the outlet 11.

When the pitcher and the lid 14 are pushed further underneath the filter vessel 10 and, hence, the lid 14 exerts a sufficient upward force on an actuating surface of the operating member 18, the operating member 18 pivots counterclockwise (as viewed in FIGS. 1-3) about pins 20. Consequently, the abutment member 23 causes the leg 15 to pivot downwardly about the shaft 16 so that the closing plug 13 moves away from and opens the outlet 11, as shown in FIG. 2. If the pitcher having the lid 14 is subsequently removed from underneath the filter vessel 10, the spring force of the arcuate, upwardly biasing resilient section 17 causes the leg 15 to pivot upwardly about the shaft 16 until the closing plug 13 sealingly engages the outlet 11.

FIGS. 6 to 9 show a second preferred embodiment of the invention in which the resilient section 17 of the closing device 12 is connected with the operating member 18 only by way of two thin connecting strips 27 unifying the elements of the closing device 12. When the closing device 12 is installed in the filter vessel 10, the resilient section 17 is merely supported on a web 26 of the operating member 18. The web 26 is disposed on the side of the operating member 18 facing away from the shaft 16. As in the first preferred embodiment, the shaft 16 is snapped into the bearing shells 25 of the ribs 24 formed on the operating member 18.

Figure 7:
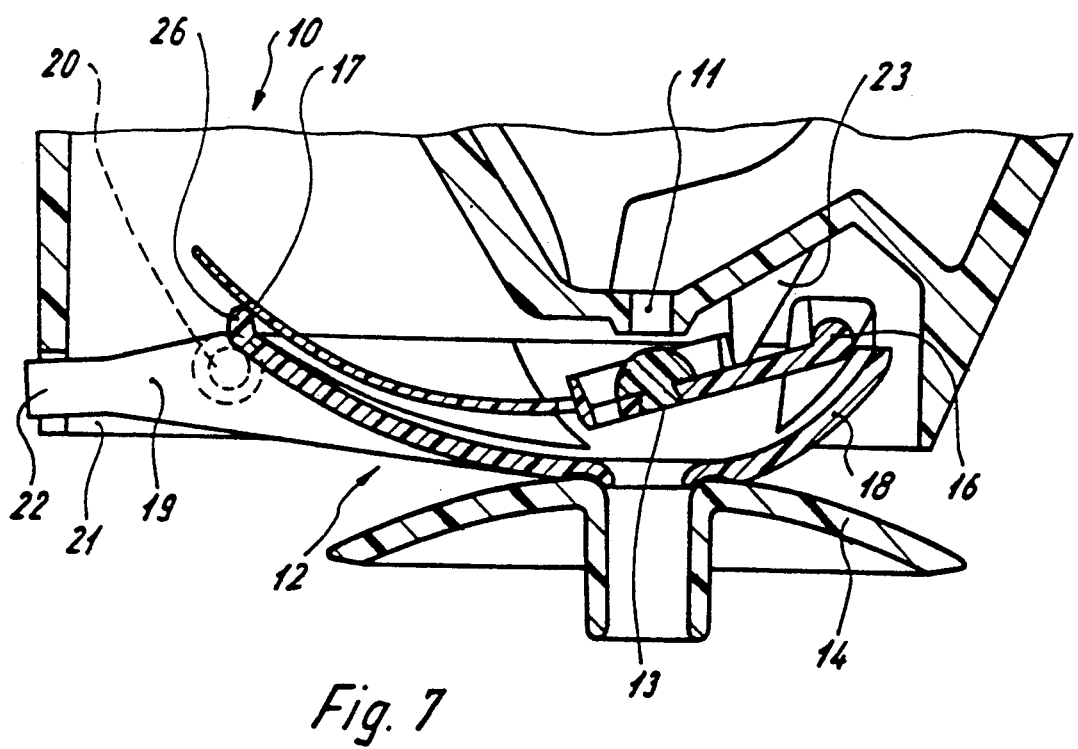
FIG. 7 is a view similar to FIG. 6, with the closing device open.
Figure 8:
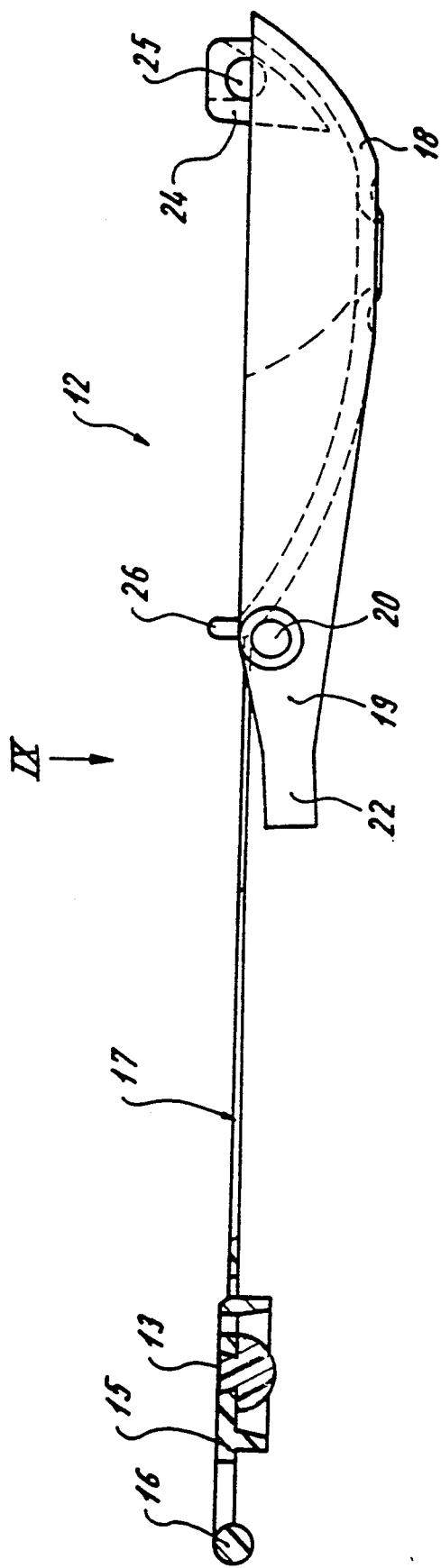
FIG. 8 is a side elevational view, partially in section, of the closing device for the filter vessel of FIG. 6 before it is installed in the filter vessel.
Figure 9:
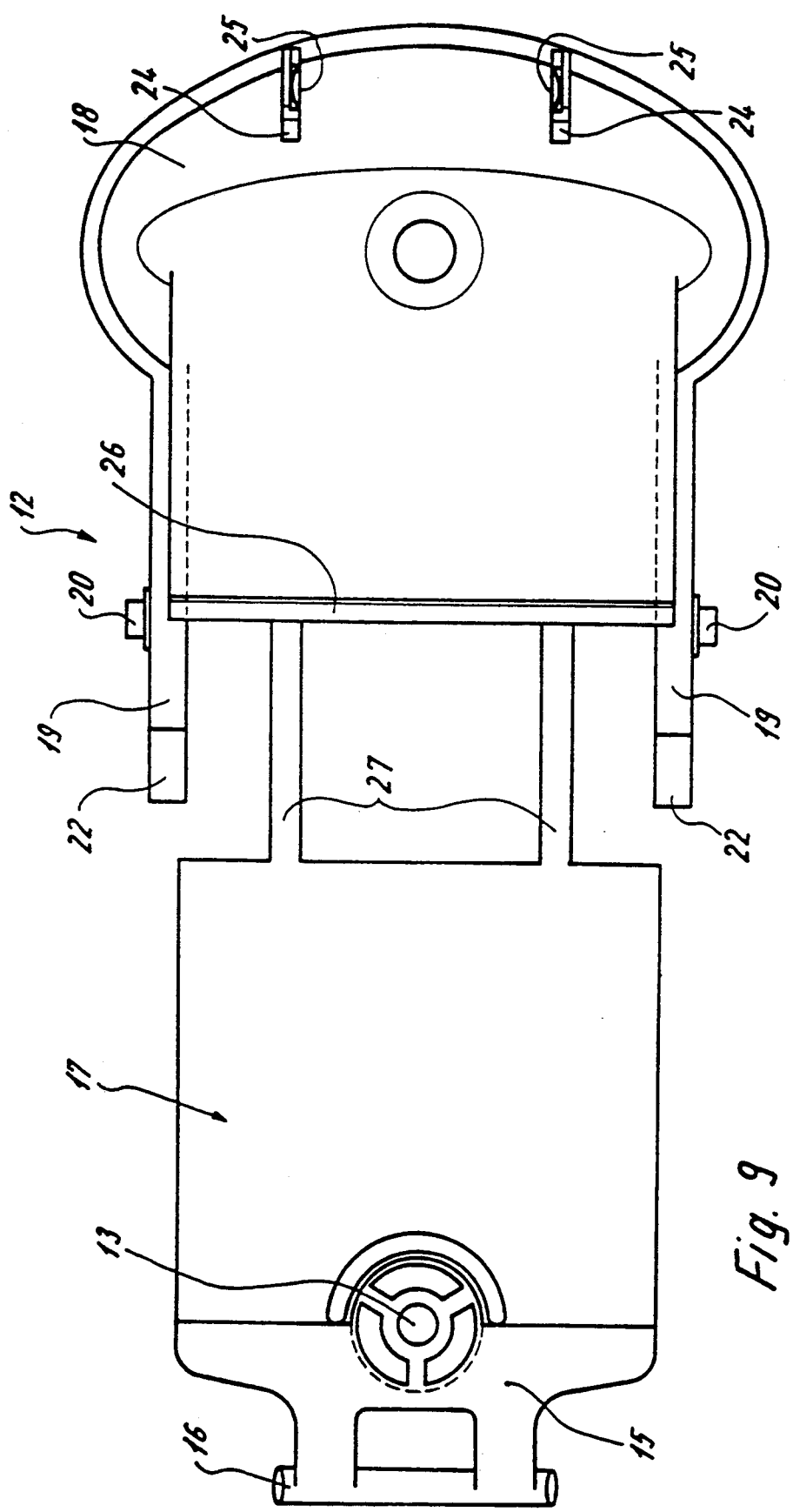
FIG. 9 is a plan view of the closing device taken in the direction of arrow IX in FIG. 8.

In the second preferred embodiment, as in the first preferred embodiment, the resiliency of section 17, serving as a biasing spring, urges the closing plug 13 against the outlet 11 of the filter vessel 10 to stop the flow of coffee or tea when no lid 14 of a pitcher (not shown) is situated underneath the closing device 12. When a pitcher with lid 14 is placed underneath the filter vessel 10, the lid 14 moves the operating member 18 upwardly relative to the position shown in FIG. 6. FIG. 7 shows a moved position in which the section 17 is bent downwardly by virtue of its engagement with the abutment member 23 of the filter vessel 10, and the web 26 of the operating member 18. Consequently, the closing plug 13 is moved away from, and thus opens, the outlet 11.

In each of the preferred embodiments the operating member 18 and the arms 19, the section 17, the leg 15 and its shaft 16 as well as the ribs 24 are made of one piece. Only the section 17 is spring-elastic relative to the other components. All of the parts are preferably made of plastic, as is the closing plug 13, which is preferably produced in one piece with the other components in a two-component injection molding process.

As an alternative, it is feasible to connect the leg 15 directly to the operating member 18, for example, by way of a film (live) hinge.

It will be understood that the above description of the present invention is susceptible to various modifications, changes, and adaptations, and the same are intended to be comprehended within the meaning and range of equivalents of the appended claims.

What is claimed is:

1. In a filter vessel for a coffee or tea maker; said filter vessel having:
    a filter holder for holding a filter and liquid so as to brew coffee or tea;
    an outlet on said filter holder for releasing brewed coffee or tea; and
    a closing device having a closing plug movable between a closed position in which said plug blocks said outlet and an open position in which said plug allows brewed coffee or tea to flow out of said filter holder through said outlet; said closing device further having an actuating component arranged to be engaged by a part of a pitcher, placed underneath the outlet, for moving the plug into the open position;
    the improvement wherein said closing device comprises:
    an operating member having first, second and third locations and being disposed below said outlet;
    first pivot means for pivotally securing the operating member at said first location to said filter holder for movement of the operating member toward and away from the outlet;
    a leg disposed below said outlet and having first and second ends; said leg carrying said plug between said first and second ends; said leg having a resilient portion at said first end; said resilient portion being supported on said second location of said operating member; said resilient portion urging said plug into the closed position;
    second pivot means for pivotally supporting the second end of said leg on said third location of said operating member for movement of said leg relative to said operating member towards and away from said outlet; and
    an abutment member disposed on said filter holder and being in engagement with said leg at a location between said plug and said second end of said leg, whereby an external pressing force exerted on said actuating component and directed toward said abutment member causes a pivotal motion of said operating member about said first pivot means towards said abutment member and a pivotal motion of said leg away from said outlet and relative to said operating member about said second pivot means against a force of said resilient portion to move said plug into said open position.

2. A filter vessel as defined in claim 1, wherein said second pivot means comprises a shaft formed on said second end of said leg; said operating member comprising two parallel arms having a free end abutted on said filter vessel for limiting a path of the pivotal movement of the operating member away from said outlet.

3. A filter vessel as defined in claim 1, wherein said leg is integral with said resilient portion; said resilient portion being arcuate.

4. A filter vessel as defined in claim 2, wherein said operating member, said arms, said resilient portion and said shaft are integrally formed of plastic.

5. A filter vessel as defined in claim 1, wherein said second pivot means comprises a rib and a bearing shell shaped on said operating member at said third location thereof; and a shaft being integrally formed with said leg at said second end thereof and being snap fitted in said bearing shell.

6. A filter vessel as defined in claim 5, wherein said rib, said bearing shell and said operating member are integrally formed of plastic.

7. A filter vessel as defined in claim 1, wherein said operating member comprises two parallel arms interconnected by a web portion; further wherein said resilient portion of said leg is connected with said operating member by a strip; said resilient portion being a leaf spring supported by said web.

8. A filter vessel as defined in claim 1, wherein said second pivot means comprises a film hinge directly integrally attached to said leg at said second end and to said operating member at said third location.

9. A filter vessel as defined in claim 1, wherein said operating member and said abutment member are configured so as to be in constant contact.

* * * * *